(12) United States Patent  (10) Patent No.: US 8,996,244 B2
Summer et al.  (45) Date of Patent: Mar. 31, 2015

(54) IMPROVISED EXPLOSIVE DEVICE DEFEAT SYSTEM

(75) Inventors: Matthew D. Summer, Melbourne, FL (US); Paul M. Bosscher, West Melbourne, FL (US); John B. Rust, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 572 days.

(21) Appl. No.: 13/267,357

(22) Filed: Oct. 6, 2011

(65) Prior Publication Data
US 2013/0090764 A1 Apr. 11, 2013

(51) Int. Cl.
G06F 7/00 (2006.01)
F41H 11/16 (2011.01)

(52) U.S. Cl.
CPC ............................. F41H 11/16 (2013.01)
USPC .......................................................... 701/36

(58) Field of Classification Search
USPC .......................................................... 701/36
See application file for complete search history.

(56) References Cited

U.S. PATENT DOCUMENTS

| | | |
|---|---|---|
| 3,280,991 A | 10/1966 | Melton |
| 3,637,092 A | 1/1972 | George et al. |
| 4,216,467 A | 8/1980 | Colston |
| 4,521,685 A | 6/1985 | Rebman |
| 4,604,016 A | 8/1986 | Joyce |
| 4,655,673 A | 4/1987 | Hawkes |
| 4,661,032 A | 4/1987 | Arai |
| 4,762,006 A | 8/1988 | Asakawa et al. |
| 4,791,588 A | 12/1988 | Onda et al. |
| 4,795,296 A | 1/1989 | Jau |
| 4,837,734 A | 6/1989 | Ichikawa et al. |
| 4,842,308 A | 6/1989 | Spotts |
| 4,853,874 A | 8/1989 | Iwamoto et al. |
| 4,860,215 A | 8/1989 | Seraji |
| 4,862,751 A | 9/1989 | Asakawa et al. |

(Continued)

FOREIGN PATENT DOCUMENTS

| | | |
|---|---|---|
| EP | 0672507 A1 | 9/1995 |
| EP | 1 876 505 A1 | 1/2008 |

(Continued)

OTHER PUBLICATIONS

Information about Related Patents and Patent Applications, see section 6 of the accompanying Information Disclosure Statement Letter, which concerns Related Patents and Patent Applications.

(Continued)

*Primary Examiner* — Thomas Tarcza
*Assistant Examiner* — Adam Alharbi
(74) *Attorney, Agent, or Firm* — Robert J. Sacco, Esq.; Fox Rothschild LLP

(57) ABSTRACT

A robot system (50) includes a control system (101) having a control interface grip (102). The robot system includes a macro robotic arm (54) and a micro robotic arm (60). The robot system is arranged such that the macro robotic arm will respond, in a first control system state, to movement of the control interface grip. In particular, the macro robotic arm will move in a plurality of directions responsive to corresponding movement of the interface grip. The micro robotic arm will respond, in a second control system state, to movement of the control interface grip. In particular, the micro robotic arm will move in a plurality of directions responsive to corresponding movement of the interface grip.

14 Claims, 6 Drawing Sheets

(56) References Cited

U.S. PATENT DOCUMENTS

| | | | |
|---|---|---|---|
| 4,893,981 | A | 1/1990 | Yoshinada et al. |
| 4,975,856 | A | 12/1990 | Vold et al. |
| 5,004,391 | A | 4/1991 | Burdea |
| 5,007,300 | A | 4/1991 | Siva |
| 5,018,922 | A | 5/1991 | Yoshinada et al. |
| 5,092,645 | A | 3/1992 | Okada |
| 5,184,319 | A | 2/1993 | Kramer |
| 5,193,963 | A | 3/1993 | McAffee et al. |
| 5,231,693 | A | 7/1993 | Backes et al. |
| 5,382,885 | A | 1/1995 | Salcudean et al. |
| 5,413,454 | A | 5/1995 | Movsesian |
| 5,430,643 | A | 7/1995 | Seraji |
| 5,451,924 | A | 9/1995 | Massimino et al. |
| 5,508,596 | A | 4/1996 | Olsen |
| 5,565,891 | A | 10/1996 | Armstrong |
| 5,589,828 | A | 12/1996 | Armstrong |
| 5,619,180 | A | 4/1997 | Massimino et al. |
| 5,648,897 | A | 7/1997 | Johnson et al. |
| 5,694,013 | A | 12/1997 | Stewart et al. |
| 5,737,500 | A | 4/1998 | Seraji et al. |
| 5,792,165 | A | 8/1998 | Klieman et al. |
| 5,831,408 | A | 11/1998 | Jacobus et al. |
| 6,028,593 | A | 2/2000 | Rosenberg et al. |
| 6,047,610 | A | 4/2000 | Stocco et al. |
| 6,084,587 | A | 7/2000 | Tarr et al. |
| 6,088,017 | A | 7/2000 | Tremblay et al. |
| 6,104,158 | A | 8/2000 | Jacobus et al. |
| 6,184,868 | B1 | 2/2001 | Shahoian et al. |
| 6,191,796 | B1 | 2/2001 | Tarr |
| 6,246,390 | B1 | 6/2001 | Rosenberg |
| 6,271,833 | B1 | 8/2001 | Rosenberg et al. |
| 6,281,651 | B1 | 8/2001 | Haanpaa et al. |
| 6,522,952 | B1 | 2/2003 | Arai et al. |
| 6,535,793 | B2 | 3/2003 | Allard |
| 6,592,315 | B2 | 7/2003 | Osborne, Jr. |
| 6,636,161 | B2 | 10/2003 | Rosenberg |
| 6,705,871 | B1 | 3/2004 | Bevirt et al. |
| 6,781,569 | B1 | 8/2004 | Gregorio et al. |
| 6,793,653 | B2 | 9/2004 | Sanchez et al. |
| 6,801,008 | B1 | 10/2004 | Jacobus et al. |
| 6,857,878 | B1 | 2/2005 | Chosack et al. |
| 7,138,981 | B2 | 11/2006 | Kim et al. |
| 7,158,112 | B2 | 1/2007 | Rosenberg et al. |
| 7,168,748 | B2 | 1/2007 | Townsend et al. |
| 7,208,900 | B2 | 4/2007 | Carlson et al. |
| 7,225,404 | B1 | 5/2007 | Zilles et al. |
| 7,345,672 | B2 | 3/2008 | Jacobus et al. |
| 7,480,600 | B2 | 1/2009 | Massie et al. |
| 7,714,895 | B2 | 5/2010 | Pretlove et al. |
| 7,783,384 | B2 | 8/2010 | Kraft |
| 7,933,667 | B2 | 4/2011 | Sjoberg et al. |
| 8,226,072 | B2 | 7/2012 | Murayama |
| 8,373,391 | B1 | 2/2013 | Allen et al. |
| 8,447,440 | B2 | 5/2013 | Phillips et al. |
| 8,473,101 | B2 | 6/2013 | Summer |
| 2001/0002098 | A1 | 5/2001 | Haanpaa et al. |
| 2001/0037163 | A1 | 11/2001 | Allard |
| 2003/0169235 | A1 | 9/2003 | Gron et al. |
| 2004/0189675 | A1 | 9/2004 | Pretlove et al. |
| 2004/0254771 | A1 | 12/2004 | Riener et al. |
| 2005/0087373 | A1 | 4/2005 | Wakitani et al. |
| 2005/0252329 | A1 | 11/2005 | Demers |
| 2006/0048364 | A1 | 3/2006 | Zhang et al. |
| 2006/0066574 | A1 | 3/2006 | Kim et al. |
| 2006/0117258 | A1 | 6/2006 | Yu |
| 2006/0178775 | A1 | 8/2006 | Zhang et al. |
| 2007/0013336 | A1 | 1/2007 | Nowlin et al. |
| 2007/0050139 | A1 | 3/2007 | Sidman |
| 2007/0095582 | A1 | 5/2007 | Stuijt et al. |
| 2008/0009971 | A1 | 1/2008 | Kim et al. |
| 2008/0063400 | A1 | 3/2008 | Hudson et al. |
| 2008/0161733 | A1* | 7/2008 | Einav et al. .............. 601/34 |
| 2008/0266254 | A1 | 10/2008 | Robbins et al. |
| 2009/0074252 | A1 | 3/2009 | Dariush et al. |
| 2009/0182436 | A1 | 7/2009 | Ferrara |
| 2009/0234499 | A1 | 9/2009 | Nielsen et al. |
| 2010/0019890 | A1 | 1/2010 | Helmer et al. |
| 2010/0023185 | A1 | 1/2010 | Terwelp et al. |
| 2010/0041991 | A1 | 2/2010 | Roundhill |
| 2010/0084513 | A1 | 4/2010 | Gariepy et al. |
| 2010/0092267 | A1 | 4/2010 | Najdovski et al. |
| 2010/0100256 | A1 | 4/2010 | Jurmain et al. |
| 2010/0168918 | A1 | 7/2010 | Zhao et al. |
| 2010/0169815 | A1 | 7/2010 | Zhao et al. |
| 2010/0172733 | A1 | 7/2010 | Chalubert et al. |
| 2010/0259614 | A1 | 10/2010 | Chen |
| 2011/0015569 | A1 | 1/2011 | Kirschenman et al. |
| 2011/0046781 | A1 | 2/2011 | Summer |
| 2011/0106339 | A1 | 5/2011 | Phillips et al. |
| 2011/0144828 | A1 | 6/2011 | Chengalva |
| 2011/0155785 | A1 | 6/2011 | Laurent et al. |
| 2011/0257786 | A1 | 10/2011 | Caron L'Ecuyer et al. |
| 2012/0095619 | A1* | 4/2012 | Pack et al. .............. 701/2 |
| 2012/0150351 | A1* | 6/2012 | Bosscher et al. .............. 700/264 |
| 2012/0184955 | A1 | 7/2012 | Pivotto et al. |
| 2012/0185098 | A1 | 7/2012 | Bosscher et al. |
| 2012/0185099 | A1 | 7/2012 | Bosscher et al. |
| 2012/0294696 | A1 | 11/2012 | Summer et al. |
| 2012/0306741 | A1 | 12/2012 | Gupta |
| 2013/0328770 | A1 | 12/2013 | Parham |
| 2014/0031983 | A1* | 1/2014 | Low et al. .............. 700/257 |

FOREIGN PATENT DOCUMENTS

| | | | |
|---|---|---|---|
| FR | 2 898 824 | A1 | 9/2007 |
| GB | 2 228 783 | A | 9/1990 |
| WO | 95 30571 | A1 | 11/1995 |
| WO | 03 055061 | A1 | 7/2003 |
| WO | 2006 016799 | A1 | 2/2006 |
| WO | 2007051000 | A2 | 5/2007 |
| WO | 2008 135978 | | 11/2008 |
| WO | 2010 040215 | A1 | 4/2010 |
| WO | 2010/085184 | A1 | 7/2010 |
| WO | 2011075093 | | 6/2011 |

OTHER PUBLICATIONS

European Search Report mailed Mar. 14, 2012, Application Serial No. 11009319.2-2316, in the name of Harris Corporation.

Torres Rocco, A.C., "Development and testing of a new C-based algorithm to control 9-degree-of-freedom wheelchair-mounted-robotic-arm system". Jun. 1, 2010, Univ. of So. Florida.

Alqasemi, R., et al., "Maximizing Manipulation Capabilities for People with Disabilities Using 9-DoF Wheelchair-Mounted Robotic Arm System", 2007, IEEE.

International Search Report mailed May 12, 2014, Applicaiton Serial No. PCT/US2013/069071, in the name of Harris Corporation.

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE-Piscataway, NJ, USA, Piscataway, NJ, USA, May 19, 2008, pp. 212-219.

International Search Report mailed May 23, 2012; Application Serial No. PCT/US2011/066873 in the name of Harris Corporation.

Everett L J et al; "Automatic Singularity Avoidance Using Joint Variations in Robot Task Modification", IEEE Robotics & Automa-

(56) References Cited

OTHER PUBLICATIONS tion Magazine, IEEE Service Center, Piscataway, NJ, US, vol. 1, No. 3, Sep. 1, 1994, pp. 13-19, XP011420425.

Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, USA, IEEE, US, vol. 2, 4, Nov. 1996, pp. 425-430, XP010212433.

Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.

International Search Report mailed Jun. 28, 2012, Application Serial No. PCT/US2012/027475 in the name of Harris Corporation.

Marshall, W.C., et al., "A Testbed for Deisgn of User-Friendly, Multiple-Degree-Of-Freedom, Manual Controllers", Scientific Honeyweller, Honeywell's Corporate. Minneapolis, US Jan. 1, 1993, pp. 78-86.

International Search Report dated Oct. 29, 2012; Application Serial No. PCT/US2012/034207 in the name of Harris Corporation.

International Search Report dated Jan. 15, 2013, Application Serial No. PCT/US2012/037751 in the name of Harris Corporation.

International Search Report mailed Jan. 4, 2013, International Application Serial No. PCT/US2012/058303 in the name of Harris Corporation.

Information about Related Patents in Patent Applications, see section 6 of the accompanying Information Disclosure Statement Letter, which concerns Related Patents and Patent Applications.

Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.

Rogers, JE., et al., "Bi-directional Gap Closing MEMS Actuator Using Timing and Control Techniques", IEEE Industrial Electronics, IECON 2006—32nd Annual Conference on, IEEE, Piscataway, NJ USA Nov. 1, 2006, pp. 3469-3154.

Alqasemi R et al: "Kinematics, control and redundancy resolution of a 9-DoF wheelchair-mounted robotic arm system for ADL tasks", Mechatronics and Its Applications, 2009. ISMA '09. 6th International Symposium on, IEEE, Piscataway, NJ, USA, Mar. 23, 2009, pp. 1-7.

Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.

Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.

International Search Report mailed May 2, 2013, International Application No. PCT/US2012/051314, in the name of Harris Corporation.

Tijsma, et al., "A framework of interface improvements for designing new user interfaces for the MANUS robot arm", 2005, IEEE, 9th International Conference on Rehabilitation Robotics, Jul. 28-Jul. 1, 2005, Chicago, IL, USA.

Rocco, Ana Catalina Torres, Development and testing of a new C-based algoithm to control a 9-degree-of-freedom wheelchair-mounted-robotic-arm system, University of South Florida, Jun. 1, 2010.

* cited by examiner

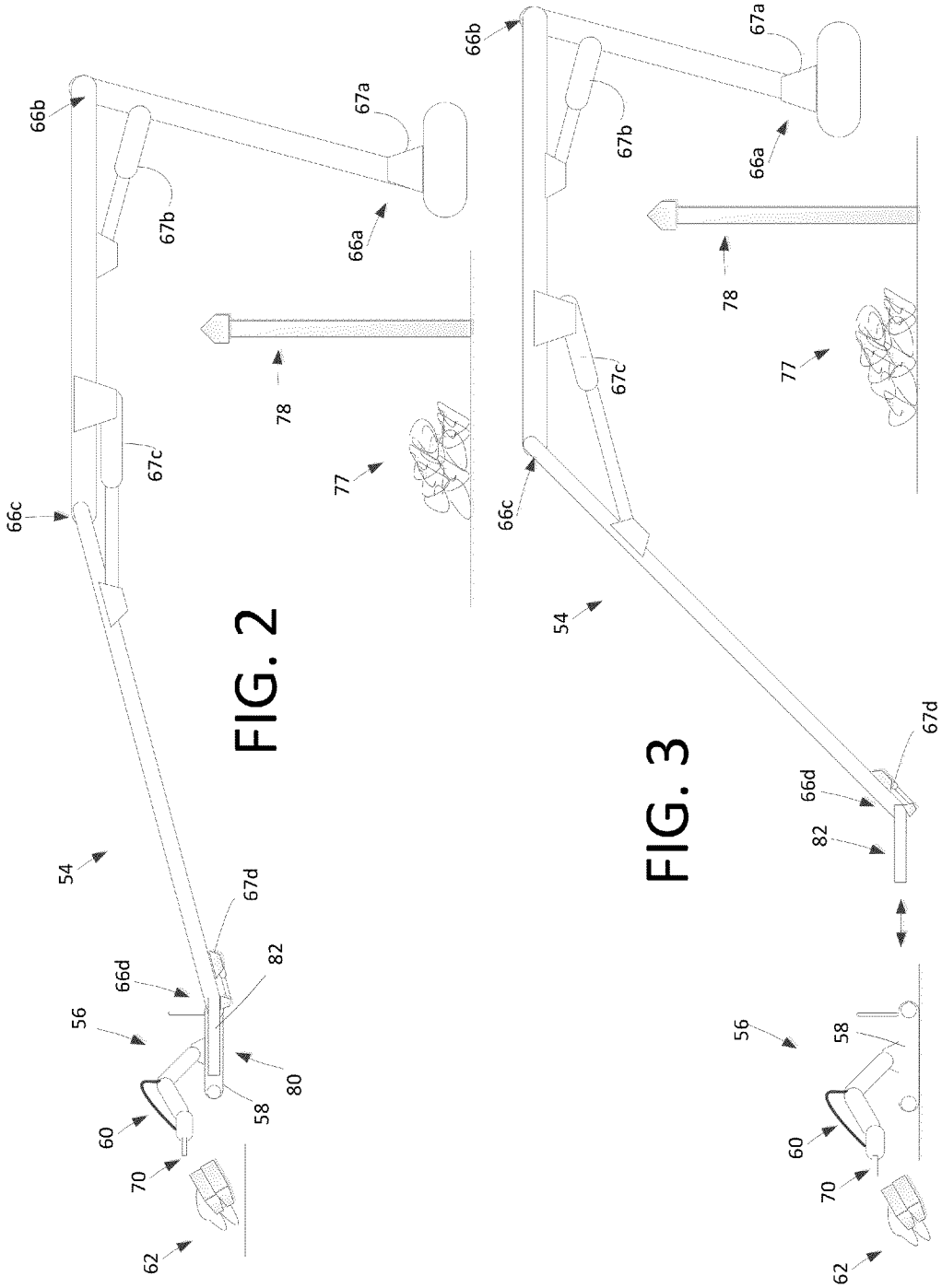

IMPROVISED EXPLOSIVE DEVICE DEFEAT SYSTEM

BACKGROUND OF THE INVENTION

1. Statement of the Technical Field

The invention concerns explosive devices, and more particularly systems and methods for defeating improvised explosive devices (IEDs) using robotic equipment.

2. Description of the Related Art

Unmanned ground vehicles (UGVs) are commonly used for defeating explosive devices, and more specifically, IED devices. Such UGVs commonly include a remotely operated battery powered vehicle which is capable of moving under its own power. One problem with UGVs is that they frequently have trouble navigating in cluttered environments. In such environments, the UGV can experience a loss of mobility when obstacles block its path or otherwise inhibit its movement. When UGVs are used for ordinance disposal, they usually include a robotic arm and a video camera which allow a user to disable an IED from a safe distance. Still, conventional UGVs tend to have relatively primitive control systems for controlling movement of the distal end of the robotic arm, where a gripping device is typically located. Such control systems commonly allow the robotic arm to be moved with four or five degrees of freedom, but often require the operator to separately control each joint. Consequently, these robot arm control systems are not very intuitive, and contribute to making the robot arm difficult to control precisely.

Another type of vehicle which has been developed to address the IED problem is the mine resistant ambush protected (MRAP) family of vehicle. The MRAP is a heavily armored fighting vehicle which is designed to transport soldiers, while also protecting them from IED attacks. In addition to providing protection, certain types of MRAPs are fitted with systems used to assist with ordinance disposal. For example, the Buffalo, which is manufactured by Force Protection, Inc., is a six wheeled vehicle that has a large 30 foot long robotic arm mounted to the frame of the vehicle. The arm, which is similar to the articulated arm of a backhoe, can be used to allow personnel to dispose of IEDs while remaining enclosed in the relative safety of the vehicle. The robot arms used on the MRAPs suffer from many of the same problems as the robot arm of the UGV, and are even more difficult to control with precision.

SUMMARY OF THE INVENTION

The invention concerns a robot system, including a control system. The control system includes a robot control interface having a control interface grip. The robot system includes at least two robotic arms, namely a macro robotic arm and a micro robotic arm. The macro robotic arm has a first set of articulating joints. The robot system is arranged such that the macro robotic arm will respond, in a first control system state, to movement of the control interface grip. In particular, the macro robotic arm will move in a plurality of directions responsive to corresponding movement of the interface grip. The micro robotic arm has a second set of articulating joints distinct from the first set. The robot system is arranged so that the micro robotic arm will respond, in a second control system state, to movement of the control interface grip. In particular, the micro robotic arm will move in a plurality of directions responsive to corresponding movement of the interface grip.

The invention also concerns a method for controlling a robot system. The method includes controlling a movement of a macro robotic arm having a first set of articulating joints in a first system state. In such first system state, the macro robotic arm is responsive to a user manipulation of a control interface grip. In particular, the macro robotic arm will move in a plurality of directions in response to corresponding movement of the control interface grip. The method further involves controlling in a second system state a movement of a micro robotic arm having a second set of articulating joints distinct from the first set. In such second system state, the micro robotic arm will move in a plurality of directions in response to corresponding movement of the control interface grip. In a third system state, the method includes controlling a movement of a vehicle base to which the micro robotic arm is attached responsive to a user manipulation of the control interface grip.

According to another aspect, the invention concerns a method for performing robotic operations on a work piece. The method includes communicating with a macro control system to control a pose of a macro robotic arm. The method also includes selectively varying the pose of the macro robotic arm to transport a micro robotic arm to a work location. The method continues while the micro robotic arm is at such work location, by communicating with a micro control system separate from said macro control system to control a pose of said micro robotic arm.

According to another aspect, the invention includes performing robotic operations on a work piece. The method involves communicating with a macro control system to control a pose of a macro robotic arm, and then selectively varying the pose of said macro robotic arm to move an unmanned ground vehicle (UGV) from a first location to a second location. While at the second location, the UGV is released from a docking station of the macro robotic arm. Thereafter, the method continues with operating a motorized vehicle base of the UGV to move the UGV from the second location to a third location. Finally, while the UGV is in the third location, a pose of a micro robotic arm attached to said UGV is controlled to perform a robotic task. The method can include controlling UGV movement using the same interface as used to control the macro and micro robot arms.

BRIEF DESCRIPTION OF THE DRAWINGS

Embodiments will be described with reference to the following drawing figures, in which like numerals represent like items throughout the figures, and in which:

FIG. 2 is a drawing that is useful for understanding how the macro robotic arm of FIG. 1 can facilitate a positioning of a micro robotic arm disposed on the UGV.

FIG. 3 is a drawing that shows how the UGV of FIG. 1 can be deployed at a worksite by using the macro robotic arm of FIG. 1.

DETAILED DESCRIPTION

Figure 1:
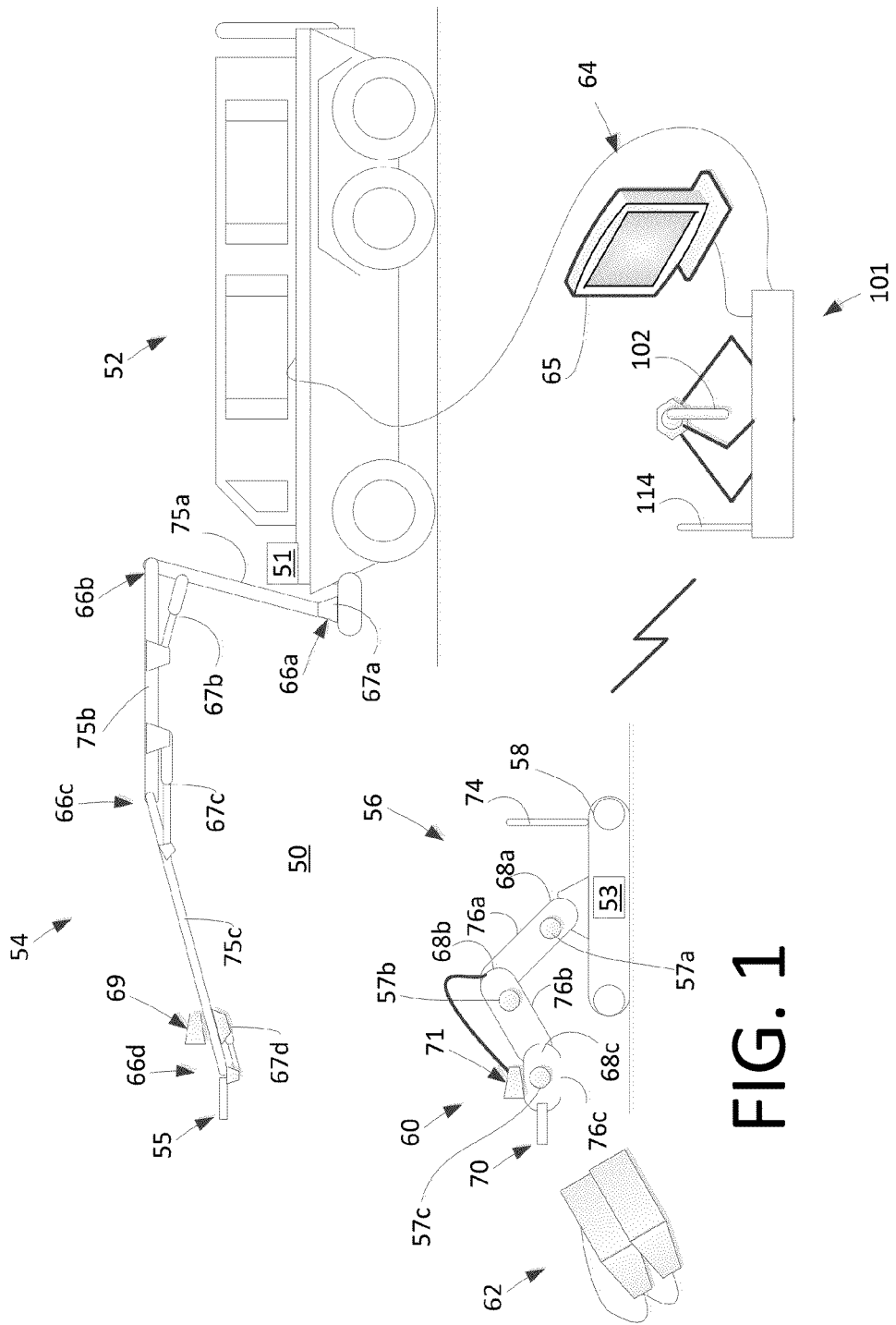
FIG. 1 is a drawing that shows a control system for controlling movement of a macro robotic arm mounted to a shelter, and a UGV having a micro robotic arm.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The invention concerns a robot system 50 and a method of using same. The robot system includes a control system 101. The control system including a control interface having a control interface grip 102. The control interface grip 102 and associated control system 101 is arranged for controlling two or more robotic systems as described herein. The controlled robotic systems can be selected to include two or more selected from the group consisting of a macro robotic arm, a micro robotic arm and a UGV. For example, in a first control system state, the control system 101 communicates with a macro control system 51 of a macro robotic arm 54. The macro robotic arm has a first set of articulating joints 66a, 66b, 66c, 66d. The macro control system 51 can be any system operatively associated with the macro robotic arm 54 which facilitates control of actuators 67a, 67b, 67c, 67d in response to control system 101. The actuators cause various elongated portions 75a, 75b, 75c of the robotic arm 54 to move relative to one another at the articulating joints. The macro robotic arm 54 is thus movable in two or more directions responsive to movement of the control interface grip 102.

In a second system state, the control system 101 communicates with micro control system 53 to control motion of a micro robotic arm 60. The micro robotic arm 60 has a second set of articulating joints 68a, 68b, 68c which are distinct from those of the macro robotic arm 54. The micro control system 53 can be any system operatively associated with the micro robotic arm which controls a plurality of actuators 57a, 57b, 57c for moving various elongated portions 76a, 76b, 76c relative to one another at the articulating joints. As such, the micro robotic arm 60 is movable in a plurality of directions (e.g. orthogonal directions) responsive to movement of the control interface grip 102 in corresponding directions. The control system 101 is configured to transition between the first control system state and the second control system state responsive to at least one user input to the control system. For example, a push-button switch 210 disposed on the grip 102 could be used to cause such transition in some embodiments.

In a third system state, the control interface grip can be used to control the movement of a UGV. In some embodiments the micro robotic arm described herein can be mounted on the UGV and the same control is used in three different control system states to control each of the three robotic systems. UGVs and robot operations involving the UGV will be described in further detail as the discussion progresses.

The controller 101 can be disposed inside of a shelter 52, which can be a vehicle. In a preferred embodiment, the macro robotic arm 54 can be mounted to a portion of the shelter as shown in FIG. 1. Accordingly, an operator can remain inside the shelter while controlling the movement of the macro robotic arm 54 and the micro robotic arm 60. The foregoing arrangement can be advantageous for protecting an operator when the robot system is used to defeat an improvised explosive device.

Robotic arms are well known in the art and therefore will not be described here in detail In general, the macro and micro robotic arms described herein can be implemented using any suitable arrangement as would be known to one skilled in the art now, or in the future. In one embodiment, the macro and micro robotic arms 54, 60 in FIG. 1 each includes three elongated sections. However, the invention is not limited in this regard. More or fewer elongated portions in each arm 54, 60 are also possible. A variety of different types of actuators can be used for effecting such movement of the elongated portions of each arm 54, 60 about the articulating joints. For example, electric, hydraulic, and pneumatic actuators are possible.

The robotic arms can also have grasping devices 55, 70 which can be used to manipulate various objects. Robotic grasping devices are well known in the art and therefore will not be described here in detail. In some embodiments, movement of one or both of the grasping devices 55, 70 is controlled by control system 101. For example, the control system 101 includes one or more interface controls (e.g. a trigger disposed on the grip 102), which permit a user to cause one or more robot fingers on the grasping devices to open or close so as to effect grasping of portions of a work piece 62. Similarly, rotation of the grip 102 can in some embodiments be configured to cause rotation of the grasping device when the control system is in the first or second state.

According to a preferred embodiment, the macro robotic arm has a macro range of movement which exceeds a micro range of movement of the micro robotic arm. In one example, the macro robotic arm can have an overall length of about 30 feet, whereas the micro robotic arm can have an overall length of about 3 feet. Regardless of the exact length of each arm, the macro robotic arm can have a reach or range of movement which is approximately five to twenty times larger than that of the micro robotic arm. Still, the invention is not limited in this regard and the relative difference in length of the two arms can be larger or smaller. Further, the macro robotic arm can have a macro precision of movement which is less precise than a micro precision of movement of the micro robotic arm. Stated differently, the motion of the micro robotic arm can be controlled with much greater precision as compared to the motion of the macro robotic arm. The greater precision associated with the micro robotic arm can be achieved using any arrangement as would be known to one skilled in the art. For example, the greater precision in the micro robotic arm can be achieved by controlling the tolerances of the mechanical linkages, and through more precise control over the motion of the actuators.

The control system 101 can communicate with the macro control system 51 and/or micro control system 53 by means of any suitable communication link. For example, a wired or wireless link can be provided for effecting such communications. In FIG. 1, a wired connection link 64 is shown as the means for communicating with macro control system 51, and a wireless link is used to communicate with the micro control system 53. The wireless link can be effected using wireless data transceivers (not shown) and suitable antennas 114. Still, the invention is not limited in this regard, and the control system 101 can communicate with the respective robotic arms using any suitable method now known or known in the future. In some embodiments, the control system 101 may not communicate with control systems 51, 53 but may instead communicate directly with the actuators associated with the particular robotic arm.

In an embodiment of the invention, the micro robotic arm 54 is mounted to a vehicle base 58 so as to form part of an unmanned ground vehicle (UGV) 56. UGVs are well known in the art and therefore will not be described here in detail. However, it should be appreciated that a UGV is a small unmanned robotically controlled vehicle. As such, the UGV generally includes a motorized base 58 powered by an onboard power source (e.g. a battery), tracks or wheels coupled to the motorized base to facilitate movement of the UGV across varied types of terrain, and a control system that is responsive to a remote control unit for controlling the movement of the motorized base. Still, the invention is not limited in this regard and other UGV types are also possible. All such UGV systems known now or in the future are intended to be included within the scope of the present invention. In an embodiment of the invention, the control system 101 and micro control system 53 can be used to control the movement of the vehicle base 58. For example, the motion of the vehicle base can be controlled responsive to a user manipulation of the control interface grip 102 in a third control system state.

In a preferred embodiment, the single control system 101 interface is sufficient to direct all aspects of operating the robot arms 54, 60 and the motorized vehicle base 58. The control interface also facilitates intuitive and precise control over the robotic arm(s) in three dimensions. As such, the system described herein provides significant improvements over prior art controllers that employ multiple joysticks and/or buttons to control a plurality of robotic arms. The invention also has advantages over conventional robotic arm control systems that require the use of two hands, and transitioning from a first set of controls, such as a joystick, to a second set of controls physically removed from the first set, such as buttons. The arrangement described herein offers a significant increase of convenience for the user, as the user does not need to jump from one set of controls to another. Instead, the user can simply continue to grasp a single interface control grip to direct the robotic arm(s) and vehicle base in all aspects of their operation.

In preferred embodiments the control system interface includes haptic feedback (force/tactile feedback to the operator) mechanisms that act upon the user's hand, fingers or both. Force sensors (not shown) present on the micro and/or macro robotic arm are used to generate signals for such haptic feedback. These signals are processed by micro control system 53 and/or macro control system 51, and communicated to control system 101. The control system 101 can then generate the appropriate haptic feedback force. In this manner, the interface permits the user to sense when the robotic arm 54, 60 is striking an object, how hard the robotic arm is pushing or pulling on an object, and/o how hard the grasping device of each arm is bearing down upon an object. For example, the control system 101 can be configured to generate in the first control system state a first haptic force upon the interface grip 102 responsive to a detected force exerted upon the macro robotic arm 54. Similarly, the control system 101 can be configured to generate in the second control system state a second haptic force upon the control interface grip 102 responsive to a detected force exerted upon the micro robotic arm 60.

In an embodiment of the invention, an image sensor 69, 71 is disposed on the robotic arm 54, 60 respectively, and a video display 65 is positioned at a location near the control system 101. The system is operatively arranged so that image sensor signals are communicated to the video display device using an appropriate communication link. Consequently, images detected by the image sensor can be displayed on the video display device 65. The image sensors 69, 71 are advantageously disposed near a distal end of the robotic arm 54, 60, proximate to a location where a robotic gripper 55, 70 is mounted. The video display device and associated control circuitry can be arranged so that the image generated from image sensor 69 is automatically displayed on the video display device 65 when the control unit is in its first operational state (i.e., controlling the macro robotic arm 54). Conversely, the image generated from sensor 71 can be automatically displayed when the control unit is in its second operational state (i.e., controlling micro robotic arm 60). Further, the displayed image can be manually controlled by an operator.

Referring once again to FIG. 1, there may be certain situations in which a mobility of the vehicle base 58 may be restricted by obstacles such as debris, fences or structures. Such obstacles can prevent the vehicle base 58 from moving the micro robotic arm 60 in proximity to the work piece 62. Consequently, the micro robotic arm may not be able to reach the work piece. In such scenarios, the macro robotic arm 54 and the micro robotic arm 60 can function cooperatively to overcome the limitations of the vehicle base 58.

According to another aspect of the invention, the invention concerns a method for performing robotic operations on a work piece 62. The method includes communicating with the macro control system 51 to control a pose of a macro robotic arm 54. The method also includes selectively varying the pose of the macro robotic arm 54 to transport a micro robotic arm 60 to a work location (e.g. a location in proximity to work piece 62). The method continues while the micro robotic arm is at such work location, by communicating with the micro control system 53 to control a pose of the micro robotic arm. This aspect of the invention will now be described in further detail.

Figure 4:
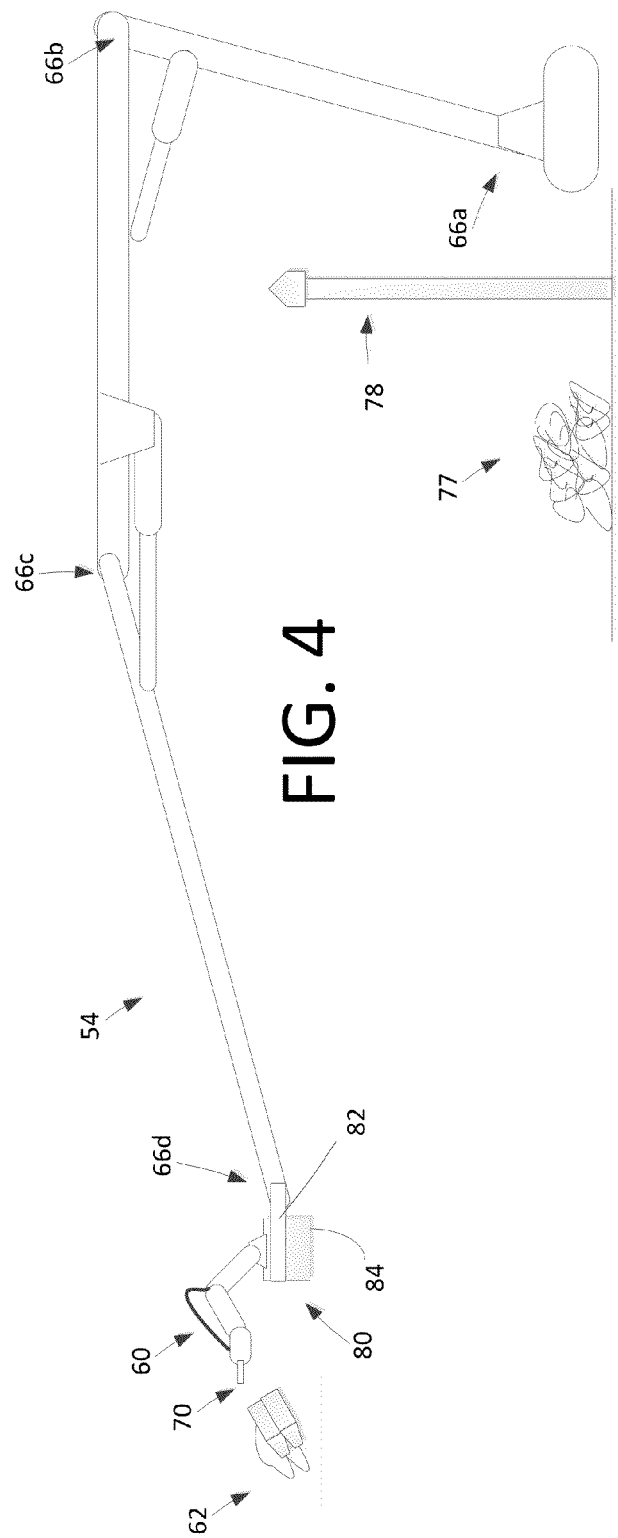
FIG. 4 is a drawing which is useful for understanding an alternative embodiment of the invention in which the macro robotic arm of FIG. 1 can position a micro robotic arm at a worksite when access is limited by an obstruction.

As shown in FIGS. 2 and 4, the micro robotic arm 60 is configured so that it is supported at a distal end 80 of the macro robotic arm 54. Such an arrangement is advantageous to facilitate positioning the micro robotic arm 60 in proximity to an object or work piece 62 upon which some robot action is to be performed. Such an arrangement is particularly advantageous when the access of the UGV to a work piece 62 is restricted by obstacles such as fences 78 and debris 77.

In an embodiment of the invention shown in FIG. 2, the entire UGV 56, including the vehicle base 58, is supported in a docking station 82 at distal end 80 of the macro robotic arm 54. The docking station 82 can be a grasping device 55 or can be any other mechanical structure configured to securely engage the UGV 56. In some embodiments, the docking station can include a power and/or a communication interface for communicating power and/or control signals to the UGV. Still, the UGV can operate entirely independently of the macro robotic arm while being supported in the docking station. For example, communications signals can be communicated to the UGV wirelessly as previously described in relation to FIG. 1, and the power to the UGV can be provided by a battery pack.

In the embodiment shown in FIG. 4, the vehicle base 58 of the UGV is omitted and micro robotic arm 60 is instead carried in the docking station 82 in a non-motorized robot arm base unit 84. In such an embodiment, the non-motorized robot arm base unit 84 can include any necessary power supply, communication and control circuitry for the micro robot arm 60 that is normally provided as part of the UGV.

With the arrangement shown in FIGS. 2 and 4, the control system 101 can be used in the first operational state to control macro robotic arm 54 so that the micro robot arm 60 is moved in close proximity to a work piece 62. For example, an operating location of the micro robotic arm 60 can be moved (by controlling the macro robotic arm) so that the micro robotic arm is in reach of the work piece. Once the micro robotic arm is positioned in this way, the control system 101 can be transitioned to its second operational state in which it controls the movement of the micro robotic arm 60. The foregoing arrangement has two advantages; it offers the extended reach of the macro robotic arm, and the greater precision of movement of the micro robotic arm.

In an alternative embodiment of the invention shown in FIGS. 2 and 4, the control system 101 is configured to automatically transition between the first and second control system states responsive to movement of the control interface grip. With such an arrangement, the control system 101 can be configured to have an operating state in which the control system automatically selectively generates control signals which control the micro robotic arm 60 and/or the macro robotic arm 54. Such state is sometimes referred to herein as a dual use operating state The dual-use operating state is primarily used to control the micro robotic arm 60. In this mode, if the user attempts to move or extend the micro robotic arm 60 to a location that is beyond the maximum reach of the robotic arm 60, then control system 101 will automatically generate movement commands for the macro robotic arm 54 to cause the distal end 80 to move in the direction specified by the user for the micro robotic arm 60.

By way of example, consider the case where the user is pushing the interface grip 102 forward along the direction of the Y-axis to cause the grasping device 70 of micro robotic arm 60 to reach a target position on object 62. Assume also that sensors indicate that the micro robotic arm 60 is incapable of further forward movement towards the target position. In other words, assume that the target position is beyond the maximum extended reach of the micro robotic arm 60. In this scenario, the control system 101 can generate movement commands for the macro robotic arm 54 that causes the distal end to move closer to the object 62. This movement of the macro robotic arm 54 can stop when, for example, the user pulls the grip 102 back a predetermined distance along the Y-direction. In that case, the macro robotic arm becomes substantially closer along the Y-direction with respect to the target position, thereby affording the micro robotic arm 60 an ability to reach the target position.

There may be certain situations in which obstacles prevent a UGV 56 from approaching a work piece 62 when relying exclusively upon the mobility of a vehicle base 58, and the problem cannot be overcome by using the greater reach of the macro robotic arm. For example, in some scenarios a macro robotic arm 54 cannot position the micro robotic arm 60 within reach of the work piece 62 because obstacles also prevent the shelter 52 from approaching the work piece. In other scenarios, the work piece can be an improvised explosive device and the reach of the macro robotic arm can be insufficient to provide a safe stand off distance from the perspective a human operator. In such scenarios, the docking station 82 can be configured to releasably secure the UGV at the distal end of the macro robotic arm 54 as shown in FIG. 3.

In such an embodiment, the invention can also include other methods for performing robotic operations on a work piece 62. For example, the method can involve communicating with a macro control system 51 to control a pose of a macro robotic arm 54, and then selectively varying the pose of the macro robotic arm to move an unmanned ground vehicle (UGV) 56 from a first location to a second location. While at the second location, the UGV can be released from the docking station 82 of the macro robotic arm. Thereafter, the motorized vehicle base 58 of the UGV is operated to move the UGV from the second location to a third location proximate to the work piece 62. Finally, while the UGV is in the third location, a pose of a micro robotic arm 60 attached to the UGV is controlled to perform a robotic task.

In the arrangement shown in FIG. 3, the macro robotic arm 54 can first be used to transport the UGV 56 over or across terrain so as to overcome any obstacles which would limit the mobility of the UGV. The macro robotic arm can also be used to place the UGV in relatively close proximity to the work piece 62. Still, locations accessible by the macro robotic arm 54 may not be sufficiently close to work piece 62 so as to permit access by the robotic arm 60. For example, shelter 52 may be prevented from approaching the work piece by a fence 78 or other debris 77. Accordingly, once the macro robotic arm has been used to transport the UGV over any obstacles, the UGV can be releasably deployed from docking station 82. At this point, the UGV can rely upon the vehicle base 58 to move independently of the macro robotic arm 54. For example, the vehicle base 58 can be used to transport the micro robotic arm to a location proximate the work piece. When such activity is completed, the UGV 56 can be returned to a location accessible by the macro robotic arm 54. Specifically, the vehicle base 58 can be used to return the UGV to the docking station 82, after which the UGV can be transported across obstacles 77, 78 and recovered. In a preferred embodiment, the movement of the macro robotic arm, vehicle base, micro robotic arm, and the grasping device are all under the control of a single control interface grip 102 associated with control system 101.

Figure 5:
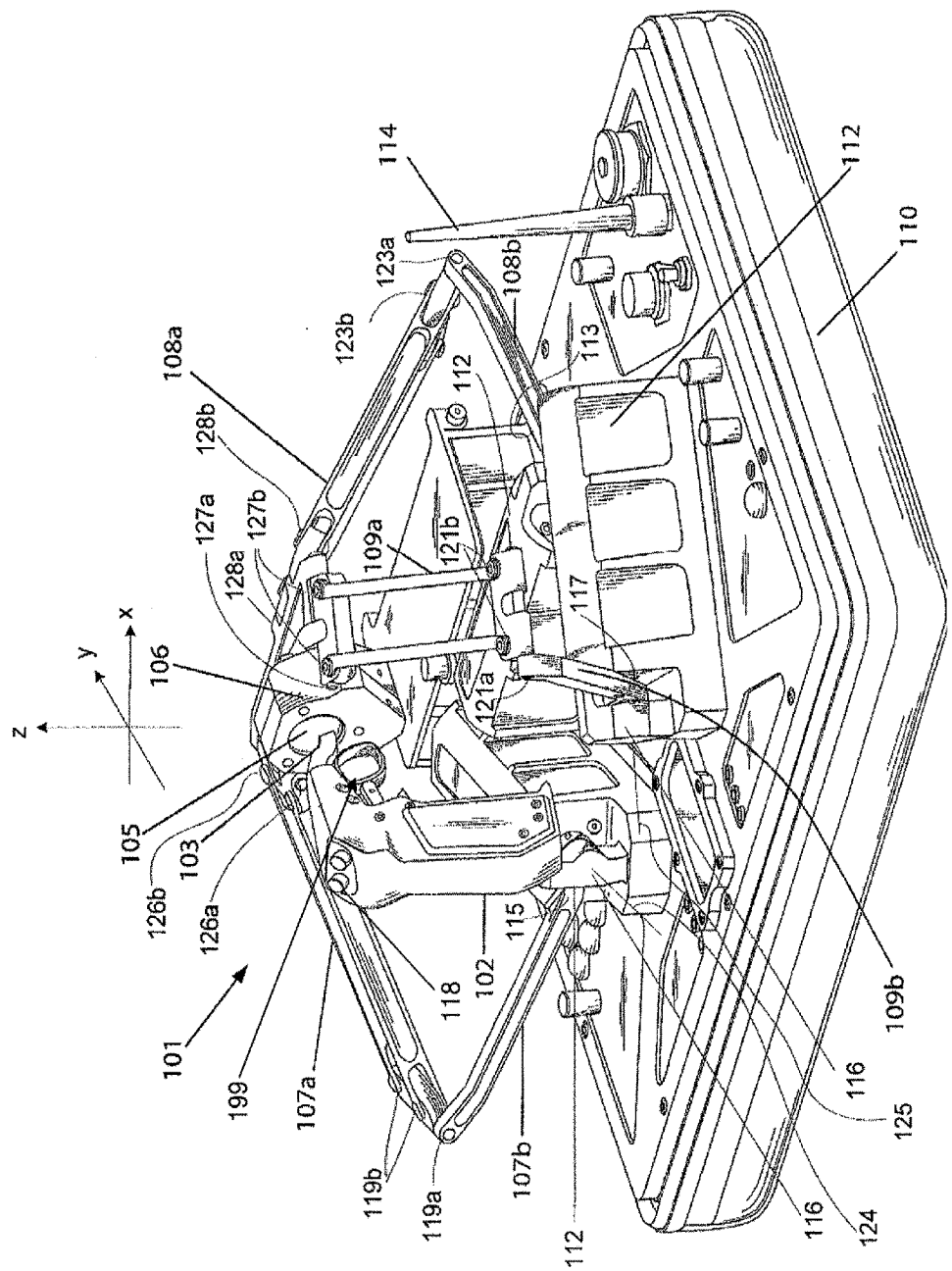
FIG. 5 is a drawing that is useful for understanding a control system that can be used with the robot system in FIGS. 1-4.

An example of control system 101 will now be described in further detail with reference to FIG. 5. The control system 101 includes a robot control interface which senses human control input gestures. For example, these input control gestures can be applied to the interface through the grip 102. The control system responds to these input gestures by generating signals which are used directly or indirectly to control vehicle base 58 and robotic arms 54, 60. In an embodiment of the invention, the control interface grip 102 is coupled via a ball joint 105 to a plurality of articulating arms 107a, 107b, 108a, 108b, and 109a, 109b. Each of articulating arms is mounted at a base end 113, 115, 117 to an interface base 110 and coupled at an opposing end to a housing 106. Each base end 113, 115, 117 pivots on a single defined axis (e.g. 124, 125) in a hinge-like manner. The articulating arms 107a-109b are assembled from a plurality of gimbal joints which are operable to permit translational movement of the housing 106 in three orthogonal directions (x, y and z). More particularly, a center portion of the articulating arms 107a-109b can comprise a plurality of joints 119a, 119b, joints 121a, 121b, and joints 123a, 123b which permit arm rotation about two transverse axes. At a housing end of the arms joints 126a, 126b, 127a, 127b, and 128a, 128b also permit rotation about two transverse axes. The arrangement of the arms and related joints permit linear translation movement of housing 106 with respect to the x, y, and z orthogonal axes.

In preferred embodiments, while the joints of the articulating arms are arranged to permit such linear translational movement, they are arranged such that the housing 106 is prevented from rotating. In other words, pitch, roll and yaw of the housing 106 is generally precluded by the attachment of the articulating arms 107a, 107b, 108a, 108b, and 109a, 109b to the housing. This type of mechanism is known in the art as a "Delta" mechanism, and the translation-only behavior of the housing has been shown in Clavel, R., "Conception d'un robot paralléle rapide à 4 degrés de liberté," Ph.D. Thesis, EPFL, Lausanne, Switzerland, 1991.

At least one sensor of a first type is provided for measuring the linear translational movement of the housing 106. Any suitable means may be employed to generate the current x, y and z movement information of the housing 106 with respect to a reference frame defined by the base 110, including both optical and electro-mechanical sensors. In one embodiment the first type sensors are a plurality of angle sensors 116 employed to respectively determine the angular movement of each joint. For example, one group of angle sensors 116 determines the respective angular positions of the base ends 113, 115, 117 with respect to the base 110. Another group of angle sensors 116 measures the angle of the joints 119a, 121a, 123a, while another group measures the angles of the joints 119b, 121b, 123b. Knowledge of the location of each joint 113, 115, 117 directly coupled to the base 110 combined with knowledge of the lengths of the arms 107a-109b and the angular positions of the joints 119, 121, 123 is used to compute the location, movement or both of the housing 106 with respect to the base 110, using known trigonometric functions. Determining the movement, position or both of the housing 106 from the angle measurements provided by the joint angle sensors 116 is known in the art (see Clavel 1991). It should be understood that this is only one possible method of measuring the translational movement of the housing 106 and the invention is not limited with respect to the measurement method used.

A pivot member is disposed in the housing 106 and is arranged to pivot with regard to three angular axes about a single pivot point. In other words, the pivot member is configured to roll, pitch and yaw about the pivot point. Any suitable mechanical arrangement can be used to form such a pivot member. However, in a preferred embodiment, the pivot member comprises a ball 105 including a ball surface which is at least partially spherical. The housing 106 includes a socket member for receiving the ball 105. A ball and socket arranged of this kind is described in further detail with respect to FIGS. 6A and 6B. A pin 103 is fixed to ball 105 and extends in a generally radial direction from the ball 105. The pin 103 is securely attached at one end to the grip 102 so that movement of the grip 102 is communicated to the ball 105. It will be appreciated that grip 102 is provided and is attached to the pivot member so that a user, upon grasping the grip 102, can cause the pivot member to rotate within the housing 106.

One or more second type sensors (not shown in FIG. 5) are mounted within housing 106 and can detect rotational motion of the ball 105 with regard to as many as three orthogonal axes (i.e., pitch, roll and yaw). The second type sensors can be any type sensor which is suitable to generate output signals which in combination allow the speed, direction or both of rotation of the ball 105 to be determined.

Output signals from the first and second type sensors are advantageously used to generate data regarding movement of the grip 102 with regard to any one of six directions. This data is then used to generate output control signals for a robotic arm 54, 60 or vehicle base 58, as discussed above. More particularly, the control system includes control circuitry which is responsive to a plurality of sensor signals produced by the first and second type sensors for generating output control signals. In some embodiments, this control circuitry can be disposed within the base 110; in other embodiments the control unit may be disposed within shelter 52. The output control signals generated by the control circuitry are configured to control one or more of the robotic arms 54, 60 and vehicle base 58.

Figure 6B:
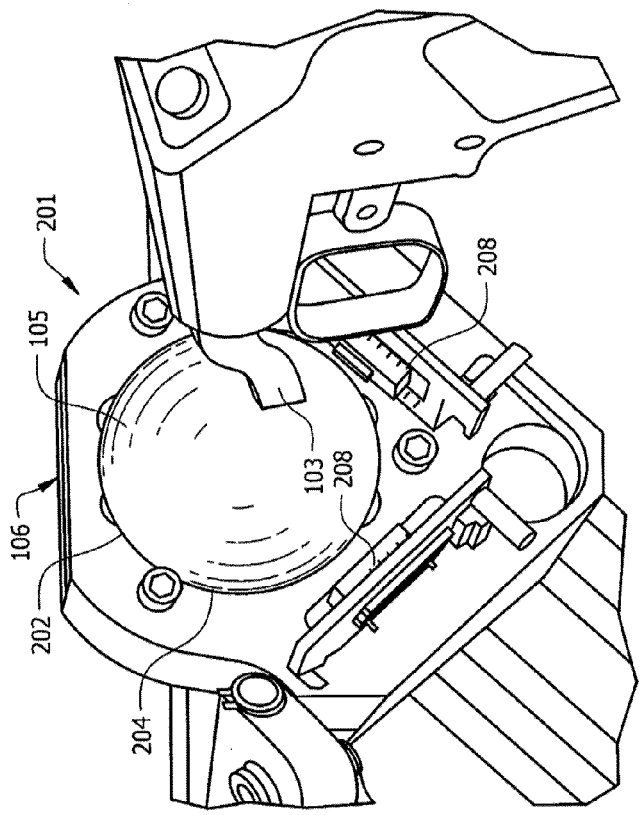
FIGS. 6A and 6B are drawings which show certain details of the control system in FIG. 5.
Figure 6A:
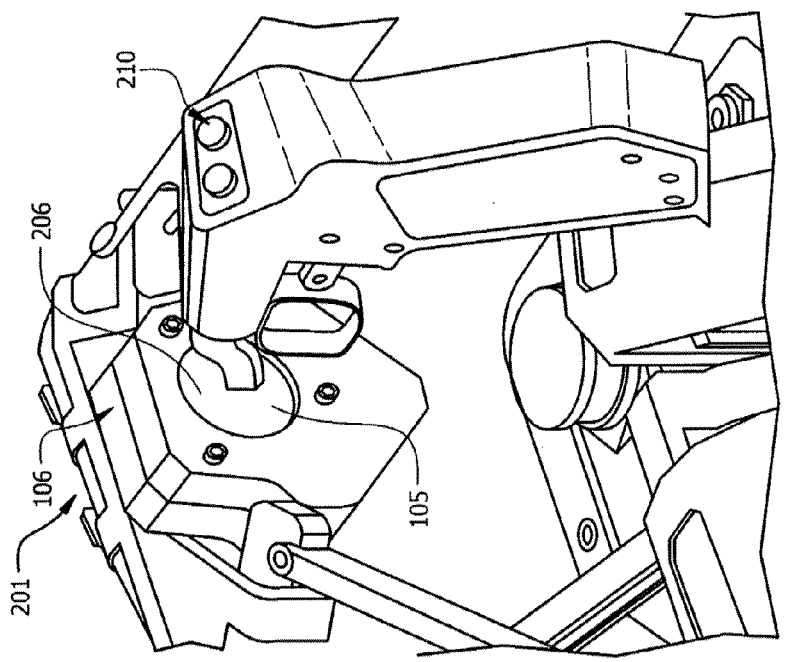

Referring now to FIGS. 6A and 6B, one embodiment of a pivot member and related structure is shown in greater detail. The pivot member includes housing 106 and ball 105 mounted therein so as to form a ball joint 201. The housing 106 is shown partially cut away in FIG. 6B to reveal a socket 202 defined within the housing 106 that is configured to accept ball 105. The socket 202 is at least partially spherical in shape. In preferred embodiments the ball 105 has a shape that is at least partially spherical in shape. The pivot member can pivot about a spherical center of the ball 105. In some embodiments, the external surface of the ball 105 is in direct mechanical contact or engagement with an inner surface 204 defined by the socket 202. As can be observed in FIG. 6B, the ball 105 is generally conformal to the inner surface 204 of the socket 202 and preferably fits snugly within the inner surface 204. According to some embodiments, the inner surface 204 forms a conjugate surface with respect to the outer surface of ball 105.

The housing 106 has an opening 206, which in some embodiments is circular; although it will be appreciated that other shapes can be used. Such an arrangement can be useful when desiring to limit movement of the ball 105 to an extent defined by the opening 206. The pin 103 extends through the opening 206 as shown. In some embodiments, the diameter of the opening 206 is advantageously formed somewhat smaller than the diameter of the ball 105 in order to retain the ball 105 inside the socket 202. In other embodiments, the size of the opening 206 can be larger than the diameter of the ball 105, and the ball joint 201 can further include a sealing cup (not shown) fitted around the opening 206 and having an opening that is smaller than the diameter of the ball 105. In some embodiments the sealing cup can be tapered in shape and sealingly connect with the sidewalls of the pin 103 so as to provide a protective cover that prevents debris from entering into the opening 206. The housing opening 206, the opening in the sealing cup, or both are dimensioned to allow the ball 105 to freely rotate within the limits defined by opening 206, the sealing cup, or both. In other words the ball 105 can roll, pitch and yaw within the socket 202.

The inner surface 204 can include a bearing surface (not shown) disposed inside the socket 202 to facilitate movement of the ball 105 in relation to the housing 106. The bearing surface in such embodiments can be detachably connected to the housing 106 or can be an integral part of the housing 106. The bearing surface reduces friction between the ball 105 and the housing 106, which decreases wear and tear of the parts and extends the useful life of the ball joint 201. Preferably, the bearing surface is a low friction lining disposed between the socket 202 and the ball 105. However, other known means for reducing friction, such as bearings or fluids, can also be used to reduce friction in the devices disclosed herein instead of or in addition to the low friction lining.

Sensors 208 are provided for sensing and measuring the movement of the ball 105 relative to the housing 106. The sensors 208 are arranged so that they are collectively able to sense and measure rotation of the ball 105 with respect to as many as three orthogonal axes (roll, pitch and yaw). In preferred embodiments, the ball joint 201 includes at least two sensors 208. Each sensor 208 is preferably capable of sensing ball rotation in at least two orthogonal directions. When two or more sensors 208 are used in this way, it is preferable that they are spaced apart around the circumference of the ball 105 as shown. Such angular spacing can ensure that there is no ambiguity in the sensed rotation direction of the ball 105.

According to some embodiments, the sensors 208 can be spaced apart by an angle of about 90° with respect to the center of the ball 105, but of course the invention is not limited in this regard. Optical sensors are particularly well suited for this purpose, but any sensor type may be employed, provided that it is capable of performing as described herein.

The first type sensors 116 and second type sensors 208, are electrically connected to control circuitry disposed, for example, within base 110. Such control circuitry advantageously generates movement data for grip 102 by using information concerning rotation of ball 105 within the housing 106 and information regarding the movement of the articulating arms 107b, 108b, and 109b. This information is then used to generate control signals for controlling one or more of the robotic arm(s) 54, 60, and motorized vehicle base 58. A wired or wireless data link can be used for the purpose of communicating motion control command signals to the robotic arms and/or vehicle base. The data link can also be used to communicate haptic information from the robotic arms (as determined from corresponding force sensors on the robotic arm) to the control circuitry. In some embodiments, the control system 101 can have an integrated data transceiver contained therein, including antenna 114. As noted above, wired connections are also possible, and may be preferred in some cases to avoid electromagnetic interference disrupting operations of the robotic arm(s).

Figure 7:
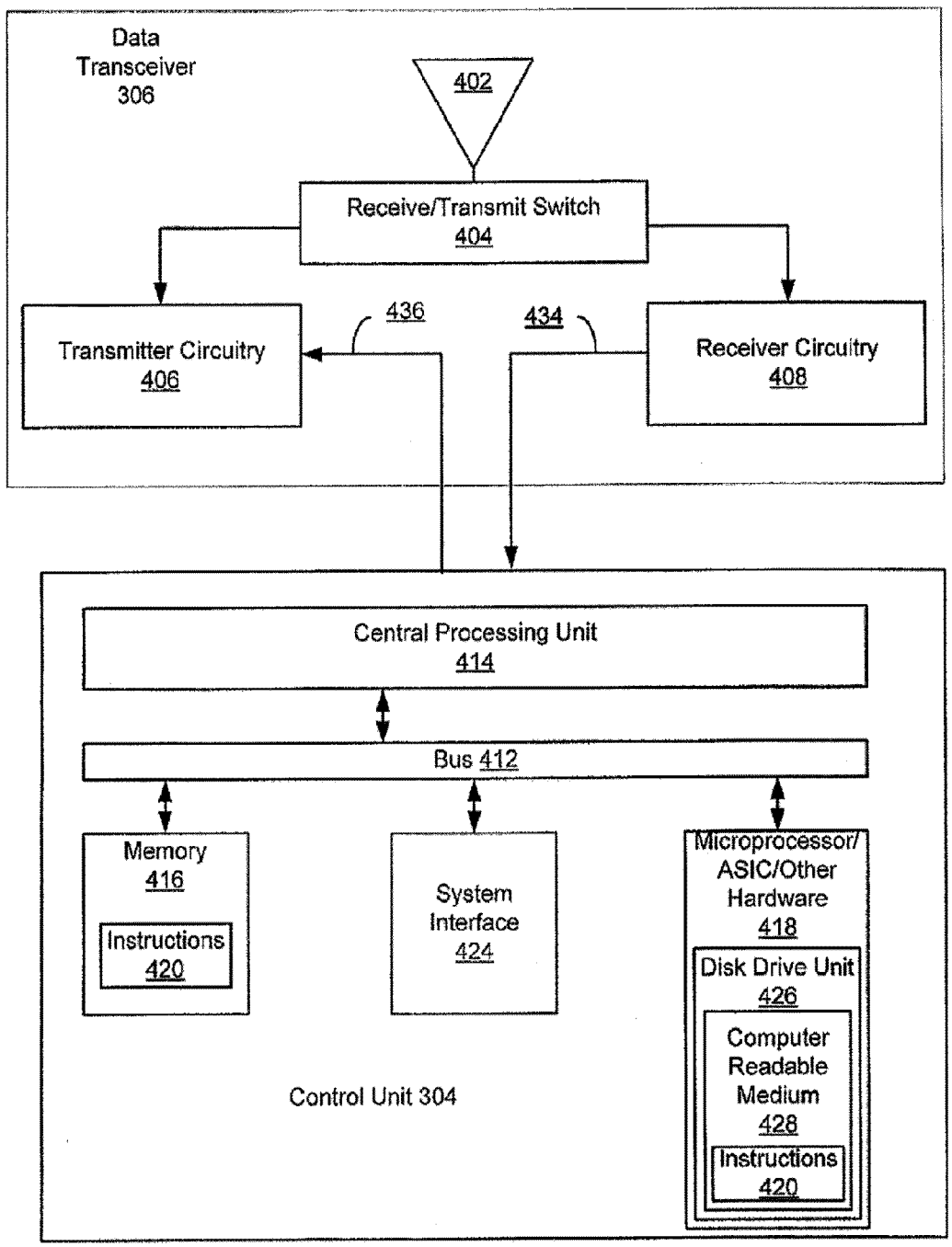
FIG. 7 is a drawing that is useful for understanding certain control circuitry associated with the control system in FIG. 5.

Referring now to FIG. 7, the control system 101 can include an embodiment control unit 304. Control unit 304 can comprise the control circuitry used in the present invention. User input signals generated by movement of the grip 102 can be transmitted, such as by wires, to the control unit 304. The control unit 304 can be disposed within base 110, or at any suitable location in the shelter 52. As shown in FIG. 7, the control unit 304 comprises a system interface 424, a Central Processing Unit (CPU) 414, a system bus 412, a memory 416 connected to and accessible by other portions of the control unit 304 through system bus 412, and hardware entities 418 connected to system bus 412. System interface 424 allows the control unit 304 to receive data from first and second type sensors 116, 208 and from thumb buttons 118 and trigger 199. The system interface 424 can also be configured to allow control unit 304 to communicate with data transceiver 306, network equipment and other computing devices via a wired, wireless or both communications link or links. At least some of the hardware entities 418 perform actions involving access to and use of memory 416, which may be a random access memory (RAM), a disk drive, and/or a compact disc read only memory (CD-ROM).

Hardware entities 418 can include microprocessors, application specific integrated circuits (ASICs) and other hardware. Hardware entities 418 may include a microprocessor programmed for facilitating the provision of data communication services and robot arm control processing as described herein. In this regard, it should be understood that the microprocessor can access and run robotic arm control processing as described herein. The communication operations can include, but are not limited to, signal receiving operations, signal processing operations, signal generation operations, and signal communication operations. Such communication operations can facilitate communications with the macro robotic arm 54, micro robotic arm 60 and vehicle base 58 to control their respective operation.

As shown in FIG. 7, the hardware entities 418 can include a disk drive unit 426 or other non-volatile memory (e.g., flash memory or ROM) comprising a computer-readable storage medium 428 on which is stored one or more sets of instructions 420 (e.g., software code). The instructions 420 can be configured to implement one or more of the methodologies, procedures, or functions described herein, such as generation of the output control signals for motion control of the robotic arms and/or motorized vehicle base 58, based upon inputs obtained from the control system 101. The instructions are also configured for sending haptic control signals to the control system 101 based upon data obtained from the robotic arm. The instructions 420 can also reside, completely or at least partially, within the memory 416 and/or within the CPU 414 during execution thereof. The memory 416 and the CPU 414 also can constitute machine-readable media. The term "machine-readable media", as used herein, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution that cause the control unit 304 to perform any one or more of the methodologies of the present disclosure. As evident from the above discussion, the control unit 304 implements one or more method embodiments of the present invention, and in particular enables a user to control movement of the robotic arms 54, 60, and/or the movement of a motorized vehicle base 58.

The control unit 304 can communicate with the robotic arms 54, 60 and/or motorized vehicle base 58 by using wired or wireless connections. A suitable data transceiver can be used for this purpose. For example, if a wireless connection is preferred, a wireless data transceiver 306 can be provided. Notably, the data transceiver 306 may include more or less components than those shown in FIG. 7. However, the components shown are sufficient to disclose an illustrative embodiment implementing the present invention.

If a wireless connection is used for communications with the robotic arm 60 and/or vehicle base 58, then the data transceiver 306 can comprise an antenna 402 (shown as element 114 in FIG. 1) for receiving and transmitting Radio Frequency (RF) signals. A receive/transmit (Rx/Tx) switch 404 selectively couples the antenna 402 to the transmitter circuitry 406 and receiver circuitry 408 in a manner familiar to those skilled in the art. The receiver circuitry 408 decodes the RF signals received from the robotic arm 60 to derive information therefrom; this includes haptic information that can be processed to provide haptic feedback to the user. The receiver circuitry 408 is coupled to control unit 304 via an electrical connection 434. The receiver circuitry 408 provides decoded RF signal information to the control unit 304. The control unit 304 uses the decoded RF signal information in accordance with the function(s) of the invention as described herein. In other embodiments a wired connection is made with one or more of the robotic arms and/or motorized vehicle base, as known in the art. For example, a wired connection may be more suitable for communications associated with control and haptic feedback from macro robotic arm 54. Such a wired connection would be functionally equivalent to a wireless connection shown in FIG. 3 but is easier to implement with respect to the communications circuitry 404, 406, 408.

The macro robotic arm 54 and micro robotic arm 60 are responsive to control signals for moving a grasping device 55, 70 in a plurality of directions. For example, the robotic arms 54, 60 can be capable of moving the respective grasping devices in as many as three orthogonal linear directions, and in a plurality of rotational directions defined by as many as three orthogonal axes of rotation. Robotic arms as described herein are known in the art and therefore will not be described here in detail. However, each of the macro and micro robotic arms 54, 60 can include a plurality of articulated joints 66a-66d and 68a-68c, each with a corresponding motor or driving device that sets the angular position of that joint as instructed by the control system 101. More specifically, by transmitting appropriate output control signals the control system can direct the controls actuators to control the spatial positioning of the tip of a grasping device 55, 70.

The position of the grasping device 55, 70 is preferably in accordance with the spatial positioning of the housing 106. The angular positioning of the robotic grasping devices 55, 70 is preferably controlled in accordance with the angular positioning of the grip 102. Power used to activate the articulated joints 68a-68c can be provided, for example, from the battery packs (not shown) associated with the robotic arm 60. Power used to activate the articulated joints 67a-67d can be provided by a power source associated with shelter 52. For example an onboard hydraulic pump (not shown) included with shelter 52 can be used for this purpose. The control unit 304, can obtain power from a battery or alternator associated with the shelter 52. Still, the invention is not limited in this regard and other power sources are also possible. One or both of the macro robotic arm and micro robotic arm can include a microprocessor based control unit and a data transceiver configured to respond to commands from the control system 101. For example if a wireless link is used to communicate with UGV 56, then the UGV can have an on-board wireless data transceiver similar to data transceiver 306, and appropriate control circuitry for responding to control signals.

One or both of the grasping devices 55, 70 can be a force-sensing grasping device, such as the one disclosed in U.S. application Ser. No. 13/049,982, entitled "Robotic Grasping Device With Multi-Force Sensing At Base Of Fingers," filed on Mar. 17, 2011, the contents of which are incorporated herein by reference. The grasping device can include fingers, the angular positions of which can be controlled to open or close relative to each other to grasp and release objects. The grasping devices are arranged to send haptic signals back to the control unit 304, as measured by, for example, the fingers. The haptic signals are used by the control system to control motive devices in the control system 101 to create a corresponding haptic feedback response for the user. This haptic feedback response can indicate, for example, the magnitude and direction of a force present on the grasping device 55 and/or 70 and/or the forces upon one or both of the robotic arms 54, 60. This could include, for example, a force that is placing a torque on the arms 54, 60. This force can be felt by the user in the form of a corresponding resistance to motion of the grip 102 in the direction of this force, the resistance being proportional to the magnitude of the force impinging on the robotic arm. In this manner a user can sense, for example, the weight of an object, how hard the grasping device is pressing against a surface, and so forth. If, for example, the angular positioning of the fingers of the grasping device 55, 70 is determined by the displacement of the trigger 199, a haptic signal in the form of resistance to depression of the trigger 199 can be generated that is proportional to how hard the fingers are bearing down upon an object being gripped. In this manner a user can determine how firmly an object is being grasped.

One or more actuators, motors or servo motors (not shown) can be disposed in relation to the control system 101 to provide these haptic feedback signals via the grip 102 and trigger 199. For example, actuators or the like in the controller base 110 can apply a force to the articulating arms 107b, 108b, and 109b, which is then experienced in the grip 102. More particularly, such actuators or motors can be disposed in motor housings 112 which are provided as part of base 110. The force generated by the motors is used to provide haptic feedback to the user. Additional actuators for providing haptic feedback to a user can be provided within grip 102 itself. For example, such an actuator can exert a force upon the trigger 199.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for performing robotic operations on a work piece, comprising:
   communicating with a macro control system to control a pose of a macro robotic arm with a proximal end coupled to a structure for sheltering an operator;
   coupling a vehicle to a distal end of said macro robotic arm opposed from the proximal end of said macro robotic arm, said vehicle having a micro robotic arm coupled thereto which is distinct from said macro robotic arm and which has motion that is controllable with greater precision as compared to a motion of said macro robotic arm;
   selectively varying said pose of said macro robotic arm to move said vehicle away from an obstacle such that said micro robotic arm may be moved into proximity of a work location; and
   while said micro robotic arm is at said work location, communicating with a micro control system separate from said macro control system to control a pose of said micro robotic arm.

2. The method according to claim 1, further comprising using a common robot control system interface to communicate with said macro control system in a first operating state, and to communicate with said micro control system in a second operating state.

3. The method according to claim 2, further comprising transitioning between said first state and said second state responsive to at least one user input to said robot control system interface.

4. The method according to claim 2 further comprising automatically transitioning between said first and second state responsive to said user manipulation of a robot control system interface grip.

5. The method according to claim 1, further comprising generating in a first state a first haptic force upon a robot control system interface grip responsive to a detected force exerted upon said macro robotic arm, and generating in a second state a second haptic force upon said robot control system interface grip responsive to a detected force exerted upon said micro robotic arm.

6. The method according to claim 1, further comprising selecting said macro robotic arm to have a macro range of movement which exceeds a micro range of movement of said micro robotic arm.

7. The method according to claim 1, further comprising selecting said macro robotic arm to have a macro precision of movement which is less precise than a micro precision of movement of said micro robotic arm.

8. A method for performing robotic operations on a work piece, comprising:

communicating with a macro control system to control a pose of a macro robotic arm coupled to a structure for sheltering an operator;

coupling an unmanned ground vehicle ("UGV") to a distal end of said macro robotic arm, said UGV having a micro robotic arm coupled thereto which is distinct from said macro robotic arm and which has motion that is controllable with greater precision as compared to a motion of said macro robotic arm;

selectively varying said pose of said macro robotic arm to move the UGV from a first location in which an obstacle prevents the UGV from reaching a work location to a second location in which the obstacle no longer prevents the UGV from reaching the work location;

decoupling said UGV from said macro robotic arm when the UGV is at the second location;

operating a motorized vehicle base of said UGV to move the UGV from said second location to a third location;

controlling a pose of said micro robotic arm to perform a robotic task, when said UGV is at said third location.

9. The method according to claim 8, further comprising operating said motorized vehicle base of said UGV to move said UGV from said third location to a fourth location, and securing said UGV in a docking station at said fourth location.

10. The method according to claim 8, further comprising using a common control system interface to control said macro robotic arm, said micro robotic arm, and said motorized vehicle base.

11. The method according to claim 10, further comprising transitioning control of said macro robotic arm, micro robotic arm, and said motorize vehicle base responsive to at least one user input to said common control system.

12. The method according to claim 10, further comprising generating a first haptic force upon a control interface grip responsive to a detected force exerted upon said macro robotic arm, and generating a second haptic force upon said control interface grip responsive to a detected force exerted upon said micro robotic arm.

13. The method according to claim 10, further comprising selecting said macro robotic arm to have a macro range of movement which exceeds a micro range of movement of said micro robotic arm.

14. The method according to claim 8, further comprising selecting said macro robotic arm to have a macro precision of movement which is less precise than a micro precision of movement of said micro robotic arm.

* * * * *